United States Patent [19]
Poumey

[11] Patent Number: 5,534,754
[45] Date of Patent: Jul. 9, 1996

[54] APPARATUS FOR SUPPLYING ELECTRICAL POWER TO AN ARC LAMP INCLUDING RESONANT CIRCUIT

[75] Inventor: Michel Poumey, Ecully, France

[73] Assignee: Cableco, Poumey, Gaz de Bordeaux and General Export Industries - Sogexi, France

[21] Appl. No.: 268,258

[22] Filed: Jun. 29, 1994

[30] Foreign Application Priority Data

Jul. 6, 1993 [FR] France ................................. 93 08534

[51] Int. Cl.⁶ ............................................ H05B 37/02
[52] U.S. Cl. ..................... 315/278; 315/219; 315/DIG. 7
[58] Field of Search ........................... 315/278, 219, 315/DIG. 7, 279; 205, 307, 291, 194

[56] References Cited

U.S. PATENT DOCUMENTS

| | | | |
|---|---|---|---|
| 4,318,170 | 3/1982 | Cabalfin | 363/133 |
| 4,410,837 | 10/1983 | Suzuki et al. | 315/289 |
| 4,733,135 | 3/1988 | Hanlet | 315/224 |
| 5,404,287 | 4/1995 | Poumey | 363/21 |

FOREIGN PATENT DOCUMENTS

| | | |
|---|---|---|
| 2687514 | 8/1993 | France . |
| 9120174 | 12/1991 | WIPO . |

*Primary Examiner*—Robert Pascal
*Assistant Examiner*—David Vu
*Attorney, Agent, or Firm*—Harris Beach & Wilcox

[57] ABSTRACT

This generator for supplying high-frequency power to an arc lamp (12), comprises:

a primary circuit (1) connected up to the terminals (5, 6) of the power-supply mains and incorporating an electromagnetic inductor (L', T) connected to a resonant circuit (7);

a secondary circuit (2) comprising, in series, the arc lamp (12) and an electromagnetic sensor ($E_1$, $E_2$) making it possible to provide magnetic coupling with the primary circuit (1) at high frequency.

The secondary circuit (2) is formed by two electrical circuits (10, 11) mounted in parallel with the terminals of the lamp (12), each of the two circuits incorporating an electromagnetic sensor coupled with the electromagnetic inductor of the primary circuit (1).

12 Claims, 4 Drawing Sheets

APPARATUS FOR SUPPLYING ELECTRICAL POWER TO AN ARC LAMP INCLUDING RESONANT CIRCUIT

BACKGROUND OF THE INVENTION

The invention relates to a generator supplying power for a lamp of the arc type.

By generator is also meant a device capable of varying the strength of the electric current and, consequently, the power passing through this lamp.

To date, various types of devices for varying the strength of the electric current in a lamp are known. In addition to the conventional triac or thyristor dimmers, operating according to the principle of chopping the sinusoid of the alternating current delivered, devices are also known which incorporate a circuit generating a voltage at a high frequency, typically several tens of kilohertz, magnetically coupled to a secondary circuit incorporating the lamp, the brightness of which it is desired to vary.

SUMMARY OF THE INVENTION

Such circuits have been shown, by way of prior art, in FIGS. 1 and 2 of the present application. The primary circuit (1) of such a device includes a resonant circuit (7) mounted in series with the terminals of a voltage rectifier bridge (4) which itself is connected to the terminals (5) and (6) of the power-supply mains. The resonant circuit (7) incorporates at least one inductor in series with a transformer T, the combination being in parallel with a capacitor C.

The characteristics of the components L and C are chosen in such a way that, at the operating frequency, the circuit (7) thus formed comes into resonance. At the same time, a rapid-type switch I, especially a high-frequency switch of the transistor or IGBT-transistor or MOS-transistor type, is mounted in series with the resonant circuit (7).

The secondary circuit (2) incorporates, in series, the lamp (3), the brightness of which it is desired to vary. This secondary circuit is magnetically coupled to the primary circuit (1) via the secondary winding of the transformer T.

The energy in the lamp (3) is varied by modulating the closed time of the switch I. In fact, the longer this closed time the greater the energy transmitted to the lamp via the magnetic coupling produced by the transformer T.

Moreover, this transformer T may be replaced by two inductors, one forming the primary in the primary circuit (1) and the other forming the secondary in the secondary circuit (2), the magnetic coupling then taking place through the air or in any medium having a magnetic permeability equal to 1.

In FIG. 2, the electrical circuit corresponds to a so-called "half-bridge" circuit and includes two switches $I_1$ and $I_2$ of the type of those described previously, and two capacitors $C_1$ and $C_2$ between which is placed a resonant circuit, in series, formed by an inductor L and a transformer T, the secondary of which is mounted in series with the lamp (3).

The impedance, seen by the primary, depending on the turns ratio of the transformer T, is a resistance which damps the resonant circuit described.

As in the previous case, the amount of energy transmitted to the lamp depends directly on the closed time of the switches $I_1$ and $I_2$.

Although these devices are particularly well suited for lamps of the conventional type, that is to say filament lamps (internal gas incandescence) or halogen lamps, they do not operate, on the other hand, for arc-type lamps.

The reason for this is that, in a known manner, in order to create the arc in this type of lamp, it is necessary to subject said lamp to a voltage much higher than its normal operating voltage, typically from one to several kilovolts compared to an arc-maintaining voltage of, for example, 100 volts.

Thus, the same secondary circuit cannot simultaneously, given these significant differences in voltage, deliver the arc striking voltage and, once the arc has been struck, cannot limit the arc current in order to prevent the lamp from being destroyed.

Furthermore, even if it were possible to achieve this set-up technically, especially by adding, in series with the lamp, an arc-current-limiting impedance (inductive or resistive ballast), at the moment that it is desired to vary the energy as a function of the brightness desired, the arc risks being extinguished.

In fact, there is a risk of seeing the appearance of blinking corresponding firstly to the extinction of the arc and, therefore, a disappearance of the secondary current. Consequently, the voltage at the terminals of the lamp rises and the arc is restruck, then a new voltage drop due to the ballast reappears with a new extinction of the arc, etc.

In other words, the devices available to date do not enable the current in an arc lamp to be effectively varied without causing it to blink.

The object of the invention is to propose a generator supplying high-frequency power to an arc lamp, especially of high power (typically 100 to 2,000 W), overcoming all the drawbacks mentioned hereinabove and just as easy to implement.

This generator supplying high-frequency power to an arc lamp comprises:

a primary circuit connected up to the terminals of the alternating power-supply mains and incorporating an electromagnetic inductor connected to a high-frequency resonant circuit;

a secondary circuit comprising, in series, the arc lamp and an electromagnetic sensor making it possible to provide for magnetic coupling with the primary circuit at high frequency, the secondary circuit being formed by two electrical circuits mounted in parallel with the terminals of the lamp, each of the two circuits incorporating an electromagnetic sensor coupled with the electromagnetic inductor of the primary circuit.

In other words, the invention consists in splitting the electromagnetic sensor of the secondary circuit into two, in imparting to these two parts different electrical characteristics, in mounting, in series with the terminals of each of these two parts, an individual circuit in such a way as to generate two separate voltages, respectively a voltage for striking the arc and a voltage for keeping said arc running, and in coupling said circuits to a resonant primary circuit capable of providing the function of current limiter due to the presence of a leakage impedance.

According to an advantageous characteristic of the invention, the two circuits, in parallel, of the secondary each incorporate a circuit-separating diode oriented so as to conduct towards the lamp in order to prevent the two magnetic sensors from short-circuiting together at the moment of striking the arc.

According to a first embodiment of the invention, the electromagnetic inductor of the primary circuit is formed by an inductor in series with the primary winding of a transformer, and the two electromagnetic sensors of the secondary circuit are formed by two independent secondary windings of the same transformer.

In another embodiment of the invention, the electromagnetic sensors and the electromagnetic inductor are formed by inductors, the magnetic coupling of the two primary and secondary circuits taking place through the air or in a medium of magnetic permeability equal to 1, in the absence of any magnetic circuit, such as, for example, a soft-iron or ferrite core or similar device of a transformer.

According to an advantageous characteristic of the invention, the primary circuit includes a voltage rectifier bridge connected up to the terminals of the power-supply mains, with which are mounted in series, on the one hand, at least one rapid switch and, on the other hand, a parallel resonant circuit comprising, in parallel, a transformer and an inductor on the one hand, and a capacitor on the other hand, for the purpose of magnetic coupling by the transformer, or a single inductor mounted in parallel with a capacitor for the purpose of magnetic coupling through the air.

Advantageously, the primary circuit includes, in parallel with the resonant circuit and the rapid switch, a capacitor intended to filter out the high-frequency components of the supply current by induction and thus to prevent any risk of these components being transferred to the power-supply mains.

In a variant of the invention, one of the circuits of the secondary includes, in series with the winding intended to supply the lamp with current, and, especially, to maintain the arc, and instead of one of the diodes, a high-frequency rectifier bridge.

In another variant of the invention, mounted in series with the discharge lamp is an inductor, and in parallel with the terminals of said inductor is a third circuit incorporating, in series, a diode and an electromagnetic relay, said relay being capable of activating or deactivating a switch connected to the terminals of the diode of the circuit supplying the electric arc in the discharge lamp.

BRIEF DESCRIPTION OF THE DRAWINGS

The manner in which the invention may be realized and the advantages which stem therefrom will become clearer from the illustrative embodiments which follow, given by way of non-limiting indication in support of the appended figures.

DESCRIPTION OF THE INVENTION

Figure 3:
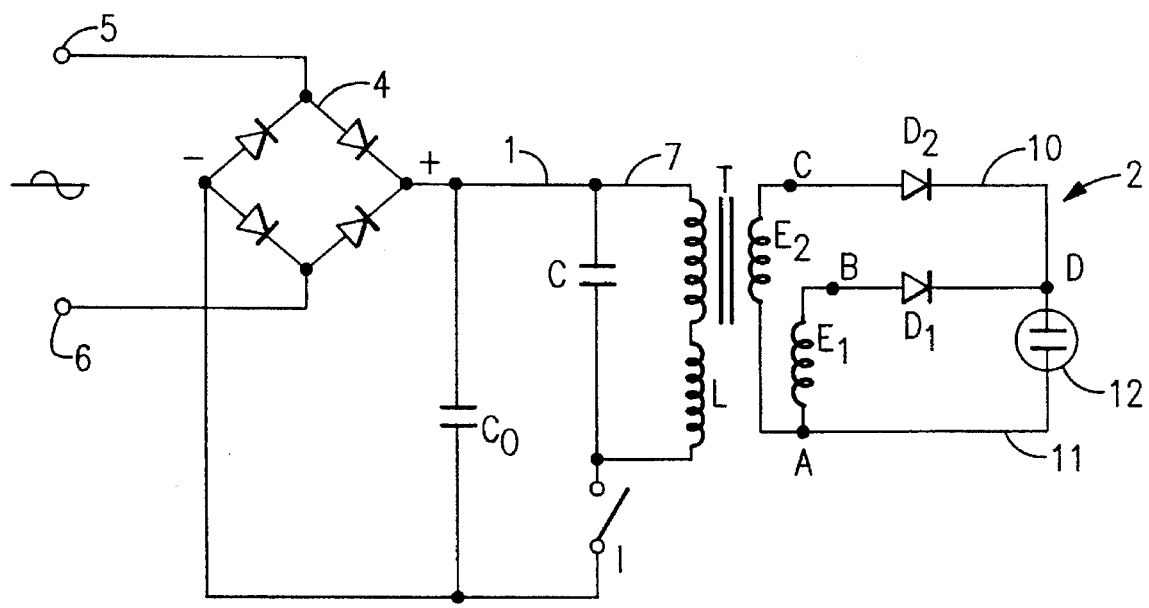
FIG. 3 is a diagrammatic representation of the electrical circuit in accordance with one of the embodiments of the invention.

According to the invention and with reference to FIG. 3, the primary circuit (1) connected up to the power-supply mains, typically 230 volts/50 hertz, is of the type described in document FR-A-2,687,514 of the Applicant.

Figure 1:
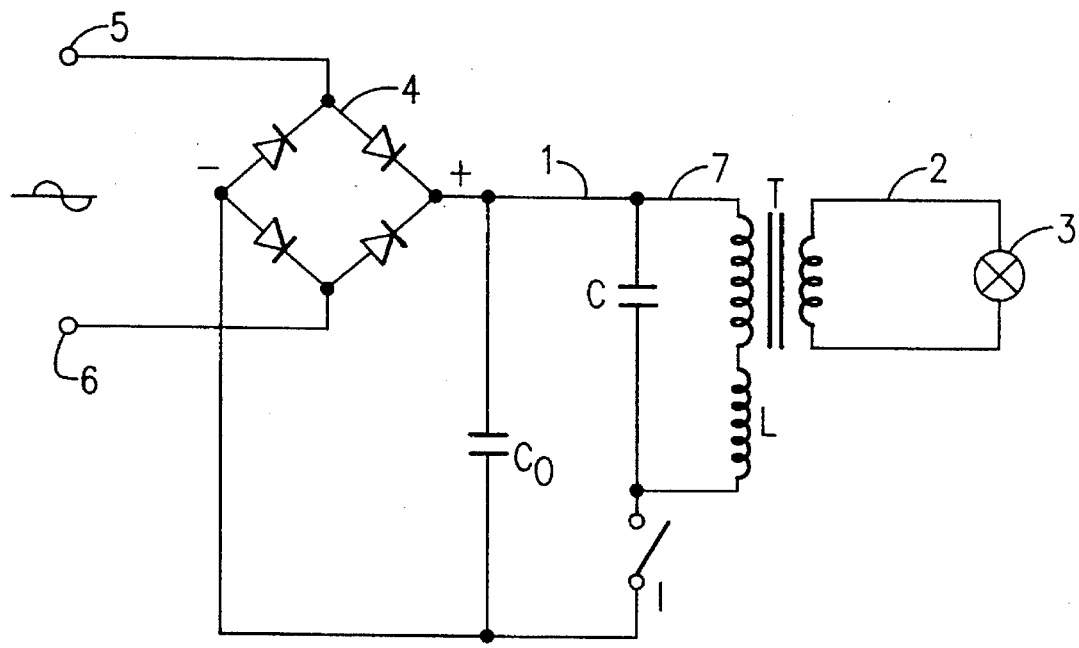
FIGS. 1 and 2, as already stated, correspond to electrical circuit diagrams of the prior art, intended for incandescent lamps of the conventional type or halogen lamp.
Figure 2:
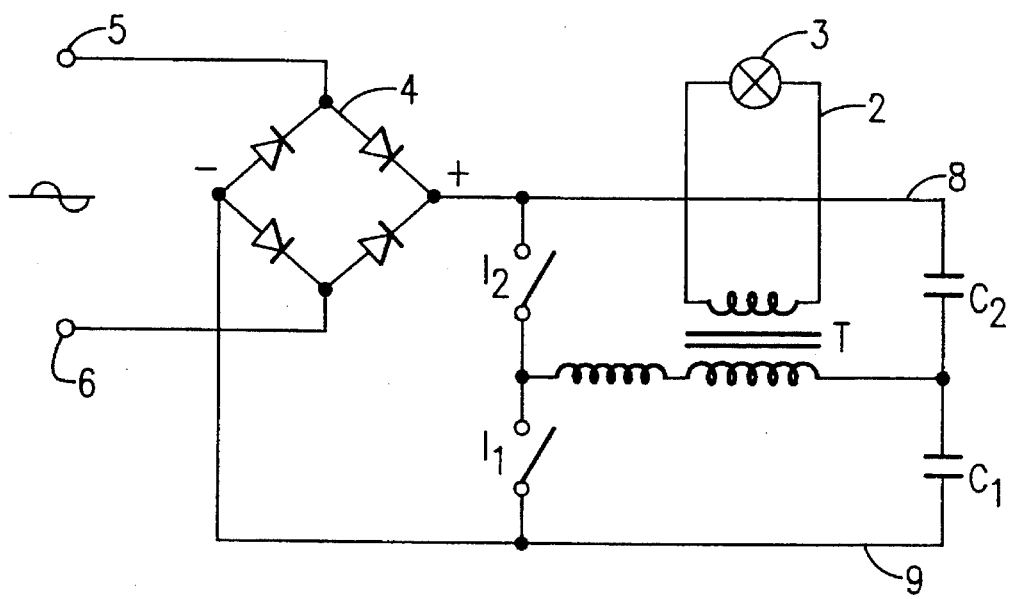

As already mentioned in conjunction with FIGS. 1 and 2, this primary circuit (1) includes, connected up to the terminals (5) and (6) of the sinusoidal alternating supply, a rectifier bridge (4) including, in a known manner, four diodes mounted in such a way as to rectify the current output by the bridge.

Mounted in series with this rectifier bridge (4) is a trap resonant circuit (7) formed, within the framework of FIG. 3, on the one hand, by an inductor L mounted in series with the primary of a transformer T and, on the other hand, a capacitor C mounted in parallel with L and T, then a rapid switch I, typically formed by a bipolar transistor, or a transistor of MOS technology or else an IGBT transistor, well known for its application in the rapid making and breaking of an electrical circuit.

The operation of the rapid switch will not be described further, except that the control of such a switch is performed by means of a monostable independent circuit, commonly termed in the field in question by the term TIMER, which is itself controlled by a synchronization circuit intended to detect the variation in a physical quantity, and, in this case, to detect the zero-crossing of the voltage at the terminals of the switch I, in this case causing, via the monostable circuit, the making of the latter.

The closed time of the switch I is adjusted by means of a control circuit which manages in fact the operating time of the monostable circuit.

Figure 4:
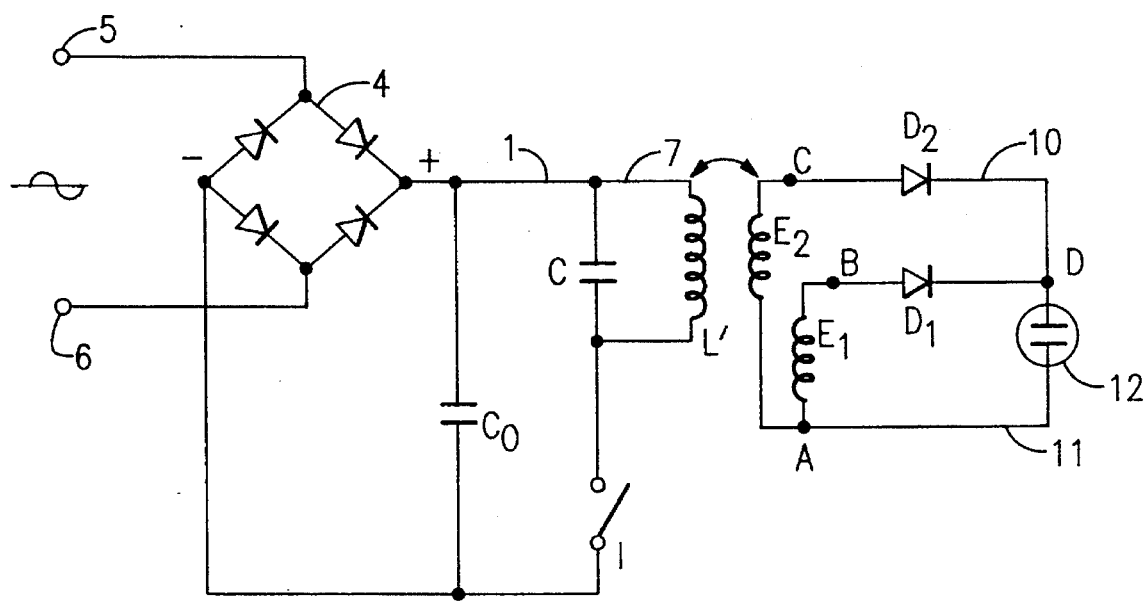
FIGS. 4, 5, 6, 7, and 8 are diagrammatic representations of electrical circuits of other embodiments of the invention.

In fact, such a circuit delivers, at the transformer T, or in conjunction with FIG. 4 at the single inductor L', a quasi-sinusoidal current, the frequency of which is linked to the natural frequency of the oscillating circuit (7) and to the closed time during which the voltage at the terminals of the switch I is zero.

FIG. 4 shows an electrical circuit diagram similar to that of FIG. 3, but in which the primary winding of the transformer T is replaced by an inductor L'. In this case, the inductor L mounted in series with the primary winding of the transformer T of FIG. 3 is no longer necessary, since it provides the role of L, namely that of a leakage impedance enabling the current to be controlled by limiting the latter in the primary circuit and, consequently, in the secondary circuit.

The secondary circuit is formed in fact by two circuits mounted in parallel, respectively (10) and (11), each of these circuits being coupled via a secondary winding, respectively ($E_2$ and $E_1$) of the transformer T, to the primary circuit.

At the same time, each of the circuits (10) and (11) includes a diode, respectively $D_2$ and $D_1$, these being mounted so as to conduct in parallel with the terminals of the arc lamp (12).

In other words, the two secondary windings $E_1$ and $E_2$ have a common terminal A which also forms one of the terminals of the lamp (12).

The winding $E_2$ is intended to deliver, between its terminals A and C, a no-load voltage of one to several kilovolts, well above that necessary for striking the arc in the lamp (12). This winding $E_2$ is made with fine wire, having a high impedance, so that it is not capable by itself of delivering the current necessary to maintain the arc at its rated current. On the other hand, it can maintain reduced illumination of the lamp (12).

Thus, as soon as the arc has been struck, the winding $E_1$, designed to deliver the rated arc-maintaining voltage, typically some hundred volts, and the rated current corresponding to the maximum illumination, thus takes over from $E_2$ and delivers the necessary energy to the lamp through the diode $D_1$.

In fact, it is observed that the two windings $E_1$ and $E_2$ then output current simultaneously, but the strength of the current delivered by $E_1$ is markedly higher.

The diodes $D_1$ and $D_2$ make it possible to prevent the short-circuiting of the windings $E_1$ and $E_2$ together during the striking of the arc.

In a variant of the invention shown in FIG. 4, the two windings $E_1$ and $E_2$ are in fact made by inductors, magnetically coupled with the inductor L' of the primary circuit.

From a practical construction standpoint, the windings $E_1$ and $E_2$ are advantageously embedded coaxially in the inductor L' of the primary circuit, either longitudinally, or alternatively in the form of flat turns so as to decrease the overall size.

The current which flows through L' or T, magnetically coupled with the windings $E_1$ and $E_2$ of the secondary-circuit, induces currents in these, the frequency of which current is equal to that of the primary resonant circuit (7). Thus, the current which flows in the lamp (12) has the same frequency and the same shape as the current passing through the inductor L' or the primary winding of the transformer T. Given the fact that the primary circuit is resonant, the inductor L or L' is never zero and therefore continuously causes current limitation in the primary circuit, this also resulting in current limitation in the secondary circuit.

It is possible to decrease the illumination by decreasing the closed times of the switches I, or $I_1$ and $I_2$ (the primary circuit of FIG. 2 also being able to operate within the scope of the invention), without thereby extinguishing the arc, by the desired adjustment range, because the winding $E_2$ continuously outputs a sufficient minimum energy, which prevents extinction, even if the winding $E_1$ is no longer operating, that is to say delivers no current for want of sufficient magnetic induction within it. In other words, a decrease in brightness is observed.

This device thus makes it possible, very simply, to supply an arc lamp from a high-performance energy variator, taking into account the high-frequency operation and the recourse to magnetic induction.

Of course, the invention is not limited to this single type of supply and transformer supply devices, irrespective of the alternating source to the primary, including the 50 or 60 Hz supply mains, can be used.

Figure 5:
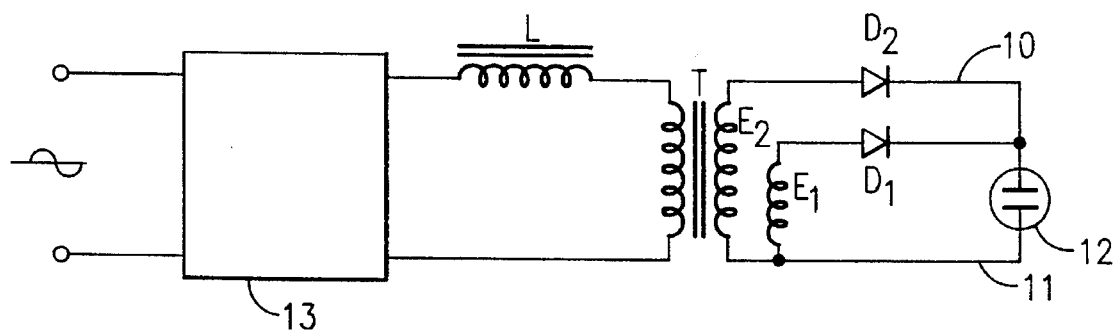

In this case, the variation in illumination may be obtained by a dimmer (13) having a triac or having two thyristors, according to the diagram of FIG. 5.

By way of example, the following values are given for a circuit of four 18 watt fluorescent tubes mounted in series:

$E_2$: winding of 2,000 turns $E_1$: winding of 200 turns primary: winding of 150 turns.

The operating frequency of the device is 40 kilohertz.

Of course, this device is adaptable to any type of arc lamp, and especially a fluorescent one of the compact or bulb type, mercury-vapor discharge lamps, sodium-vapor discharge lamps, and metal iodide ones, etc., especially high-power lamps, such as, for example, between 100 and 2,000 W. In the case of fluorescent tubes, the preheating filaments are no longer used except as electrodes, this having the advantage of them not wearing out when switching on and off frequently.

Figure 6:
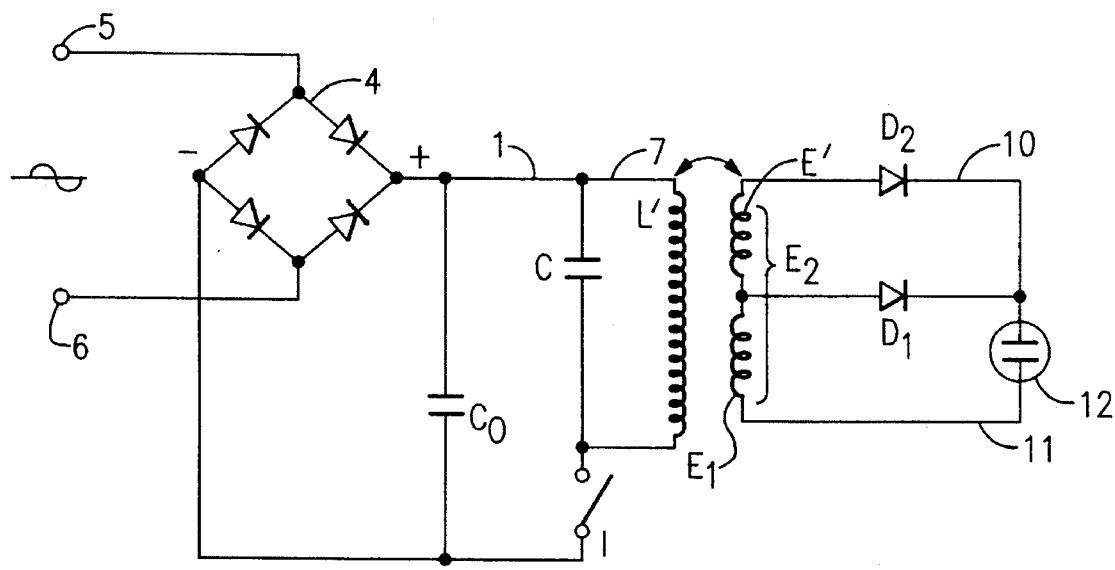

In a variant of the invention shown in FIG. 6, the winding $E_2$, intended to make it possible to deliver the arc-striking voltage, is formed by the sum of the two windings $E_1$ and E' mounted in series.

Figure 7:
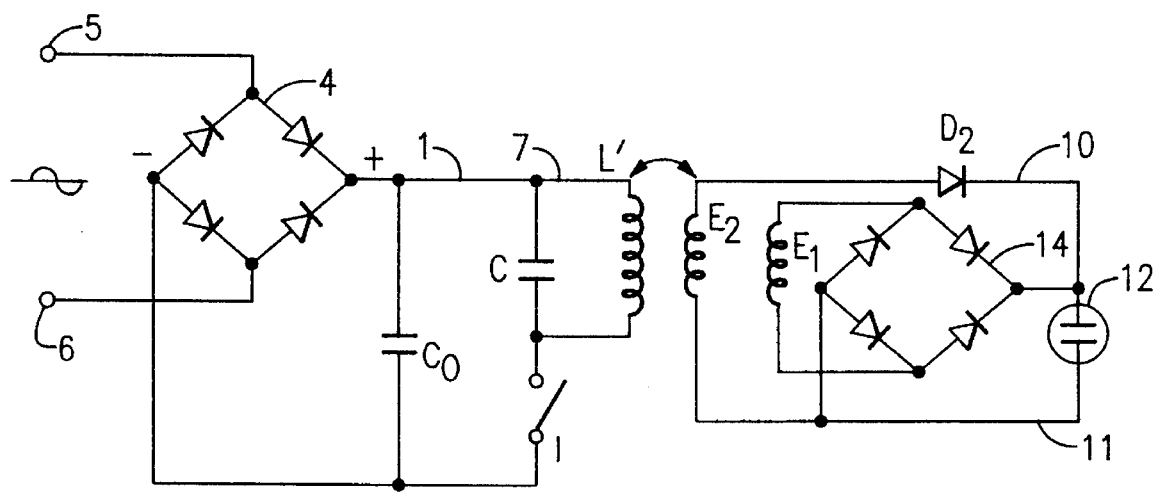

In another variant shown in FIG. 7, the winding $E_1$ is connected to the terminals of a voltage rectifier bridge (14) operating at high frequency, the arc lamp (12) being connected to the output terminals of said bridge. Thus, the two half-periods of the primary circuit are used for supplying the lamp (12) with energy. This being the case, the stresses imposed on the primary circuit (1) and, especially, on the switch I, are decreased.

Figure 8:
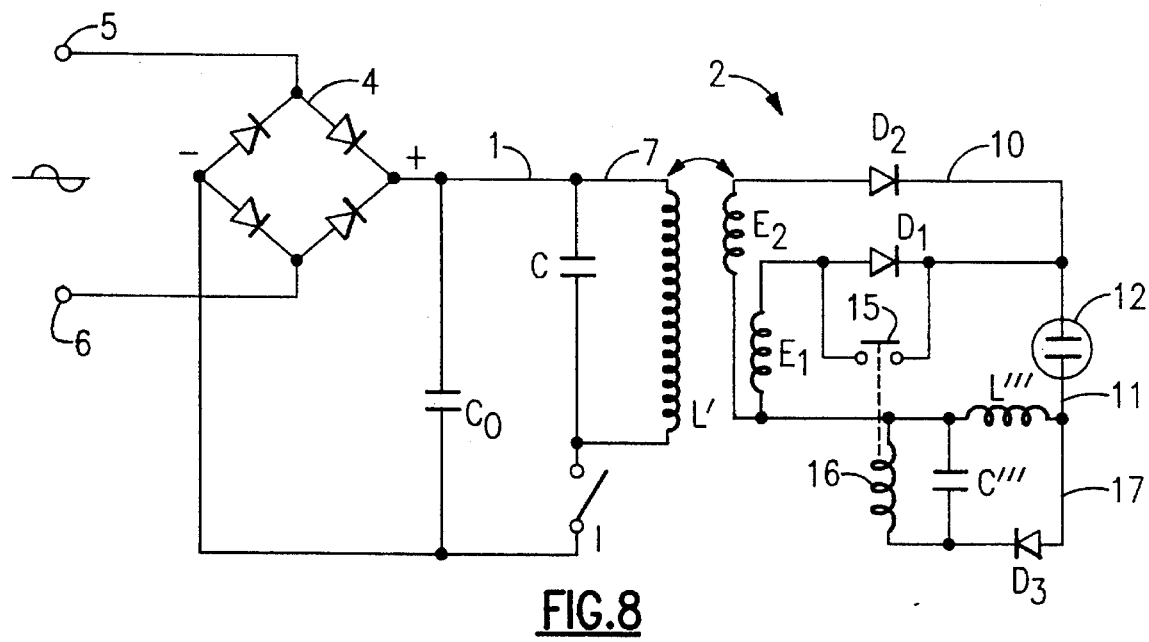

Finally, in another variant shown in FIG. 8, the circuit (11) for supplying the arc of the lamp (12) includes a switch (15), activated by means of an electromagnetic relay (16). As regards the arc-striking circuit (10), this is direct via the diode $D_2$. The circuit (11) includes, in series with the lamp (12), an inductor L''' at the terminals of which is mounted, in parallel, a third electrical circuit (17) incorporating, in series, a diode $D_3$ and the magnetic winding of the electromagnetic relay (16). Finally, the diode $D_3$ is connected to said circuit (11) via a capacitor C'''.

Thus, when striking the electric arc of the lamp via the electrical circuit (10), the switch (15) is opened, preventing the windings $E_1$ and $E_2$ from being short-circuited. On the other hand, as soon as the arc is struck, the switch (15) is closed under the action of the electromagnetic relay (16) and the circuit (11) outputs into the lamp (12), maintaining the arc. In fact, upon striking the arc, a potential difference is created at the terminals of the inductor L''', rectified by the diode $D_3$ and filtered by C'''. This potential difference actuates the electromagnetic relay (16), closing the switch (15), thus shunting the diode $D_1$, and enabling the arc to be maintained.

In the event of a microbreak in the mains or of any phenomenon liable to cause extinction of the electrical arc within the lamp (12), the electromagnetic relay (15) is released, enabling once again, as soon as the mains is operating again, said arc to be instantaneously restruck since the circuit (10) can then no longer output into the circuit (11).

Figure 9:
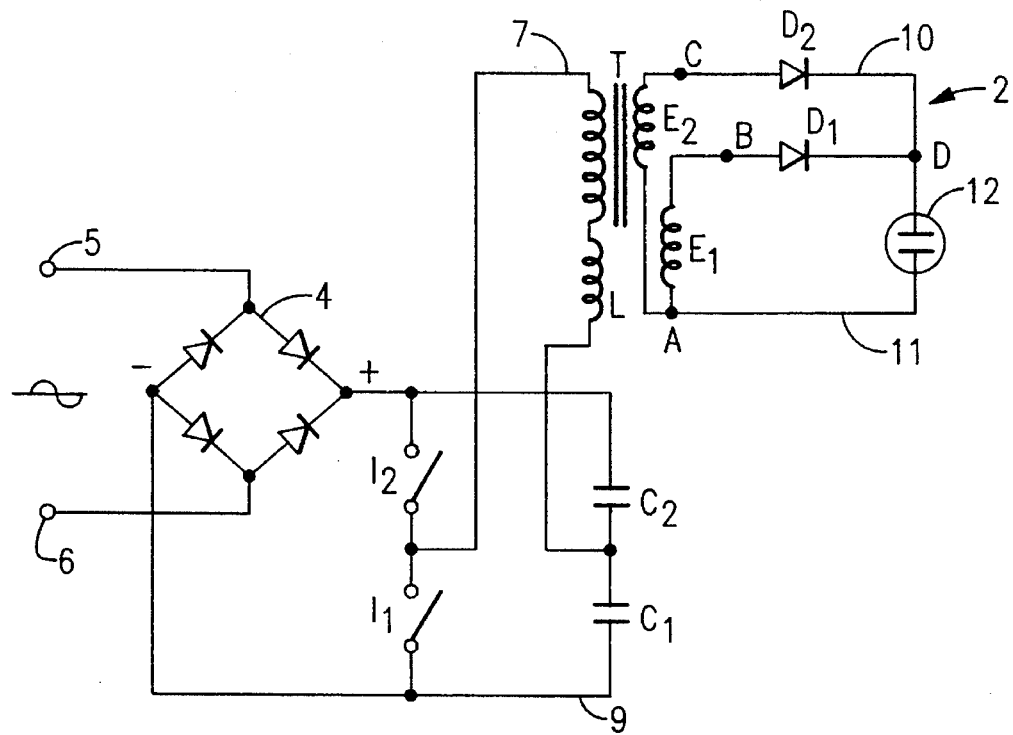

As the embodiment of FIG. 3 represents an improvement over the prior art embodiment shown in FIG. 1, the embodiment of FIG. 9 represents an improvement over the prior art embodiment shown in FIG. 2.

The embodiment of FIG. 9 is most easily understood as a variant of the embodiment of FIG. 3 which makes use of switches and capacitors that are connected in a half bridge configuration. More particularly, the embodiment of FIG. 9 includes a first capacitor $C_1$ and a first switch I, which are connected to rectifier 4 as a first half bridge circuit, and a second capacitor $C_2$ and a second switch $I_2$ which are connected to rectifier 4 as a second half bridge circuit. When switch $I_1$ is closed, capacitor $C_1$ and inductor L form a first series resonant circuit which includes the primary winding of transformer T. Similarly, when switch $I_2$ is closed, capacitor $C_2$ and inductor L form a second series resonant circuit which includes the primary winding of Transformer T. Except for the fact that two switches rather than one must be turned on and off in order to establish the desired high frequency resonant condition, however, the embodiment of FIG. 9 operates in a manner similar to the embodiment of FIG. 3. In addition, because the secondary windings and diodes of the embodiment of FIG. 9 are connected to the lamp in the same manner as in the embodiment of FIG. 3, they produce the same beneficial result discussed in connection with the embodiment of FIG. 3. In view of this close similarity, the embodiment of FIG. 9 will not be discussed in detail herein.

I claim:

1. An apparatus for supplying electrical power to an arc lamp from an electrical power source comprising:

a primary winding and first and second secondary windings magnetically coupled to said primary winding, the first of said secondary windings being connected to continuously apply a relatively high voltage to said arc lamp to strike an arc therein, and the second of said secondary windings being connected to supply a relatively low voltage to said arc lamp to operate said arc lamp after said arc has been struck;

a capacitor connected to form a high frequency resonant circuit including said primary winding;

switching means for controllably connecting said resonant circuit to said power source;

first unidirectional conducting means for connecting said first secondary winding across said arc lamp to conduct current therethrough in a first direction; and second unidirectional conducting means for connecting said second secondary winding across said arc lamp to conduct current therethrough in said first direction;

said first and second unidirectional conducting means serving to prevent the first and second secondary windings from short-circuiting together at the moment of striking the arc.

2. The apparatus of claim 1 in which each of said unidirectional conducting means comprises a diode.

3. The apparatus of claim 1 in which said resonant circuit includes an inductor connected in closed circuit relationship with said capacitor and said primary winding.

4. The apparatus of claim 1 in which said primary winding has a leakage inductance which appears in closed circuit relationship with said primary winding and said capacitor.

5. The apparatus of claim 1 in which said source comprises an AC source, and in which said apparatus further includes a rectifying circuit for connecting said AC source to said switching means and said resonant circuit.

6. The apparatus of claim 5 further including a filter capacitor connected across the output of the rectifying circuit to prevent high frequency voltages and currents from being transferred to said AC source.

7. The apparatus of claim 1 in which said primary and secondary windings are coupled via a medium having a permeability not substantially greater than one.

8. The apparatus of claim 1 in which said secondary windings and unidirectional conducting means are connected so that the voltages across the secondary windings combine additively when an arc is being struck in said lamp.

9. The apparatus of claim 1 in which said first and second unidirectional conducting means connect the respective secondary windings directly across said lamp.

10. The apparatus of claim 1 in which the second of said secondary windings is connected directly across said lamp by a full wave rectifier circuit.

11. The apparatus of claim 1 further including an electromagnetic relay having an actuating coil and a contact controlled by said actuating coil, said actuating coil being connected to said lamp and to said second secondary winding to cause said contact to short circuit said second unidirectional conducting means when said lamp conducts current after an arc has been struck therein.

12. An apparatus for supplying electrical power to an arc lamp from an electrical power source comprising:

a first half bridge circuit including a first switch and a first capacitor connected to said source;

a second half bridge circuit including a second switch and a second capacitor connected to said source;

a primary winding and first and second secondary windings magnetically coupled to said primary winding, the first of said secondary windings being connected to continuously apply a relatively high voltage to said arc lamp to strike an arc therein, and the second of said secondary windings being connected to supply a relatively low voltage to said arc lamp to operate said lamp after said arc has been struck;

an inductor for connecting said primary winding to said first and second half bridge circuits, said inductor and primary winding forming a first series resonant circuit with said first capacitor when said first switch is conducting, and forming a second series resonant circuit with said second capacitor when said second switch is conducting;

first unidirectional conducting means for connecting said first secondary winding across said arc lamp to conduct current therethrough in a first direction; and second unidirectional conducting means for connecting said second secondary winding across said arc lamp to conduct current therethrough in said first direction;

said first and second unidirectional conducting means serving to prevent the first and second secondary windings from short circuiting together at the moment of striking the arc.

* * * * *